(12) United States Patent
Yang (10) Patent No.: US 6,777,857 B1
(45) Date of Patent: Aug. 17, 2004

(54) PIEZOELECTRIC GYROSCOPE SYSTEM, AND METHOD OF USE

(75) Inventor: Jiashi Yang, Lincoln, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 397 days.

(21) Appl. No.: 10/160,638

(22) Filed: Jun. 3, 2002

Related U.S. Application Data (63) Continuation-in-part of application No. 09/271,791, filed on Mar. 18, 1999, now Pat. No. 6,140,748.
(60) Provisional application No. 60/295,534, filed on Jun. 4, 2001.

(51) Int. Cl.[7] ............................................. H01L 41/08
(52) U.S. Cl. ................................. 310/329; 73/504.04
(58) Field of Search ...................... 73/504.04, 504.08, 73/504.12, 504.14; 310/328, 329

(56) References Cited

U.S. PATENT DOCUMENTS

| | | | |
|---|---|---|---|
| 3,141,100 A | 7/1964 | Hart | 310/323.01 |
| 3,143,889 A | 8/1964 | Simons et al. | 73/504.12 |
| 3,258,617 A | 6/1966 | Hart | 310/321 |
| 3,736,446 A | 5/1973 | Berlincourt et al. | 310/8 |
| 4,253,036 A | 2/1981 | Kizaki | 310/361 |
| 4,628,734 A | 12/1986 | Watson | 73/505 |
| 5,049,776 A * | 9/1991 | Ogawa | 310/333 |
| 5,336,960 A | 8/1994 | Shimizu et al. | 310/369 |
| 5,428,995 A * | 7/1995 | Fersht et al. | 73/504.12 |
| 5,495,760 A | 3/1996 | Wirt | 73/504.13 |
| 5,504,384 A | 4/1996 | Lee et al. | 310/359 |
| 5,691,595 A | 11/1997 | Tomikawa et al. | 310/370 |
| 5,747,914 A | 5/1998 | Huang et al. | 310/318 |
| 5,767,405 A | 6/1998 | Bernstein et al. | 73/504.16 |
| 5,837,895 A | 11/1998 | Fujimoto | 73/504.12 |
| 5,847,487 A * | 12/1998 | Maeno | 310/321 |
| 5,854,427 A | 12/1998 | Terada et al. | 73/504.16 |
| 5,874,674 A | 2/1999 | Kasanami et al. | 73/504.14 |
| 5,912,524 A | 6/1999 | Ohnishi et al. | 310/321 |
| 5,912,528 A | 6/1999 | Kumada | 310/353 |
| 5,942,839 A | 8/1999 | Ohnishi et al. | 310/359 |
| 5,945,600 A | 8/1999 | Touge et al. | 73/504.14 |
| 6,018,997 A | 2/2000 | Kumada et al. | 73/504.16 |
| 6,044,706 A * | 4/2000 | Roh | 73/504.12 |
| 6,140,748 A | 10/2000 | Yang | 310/359 |
| 6,418,789 B1 * | 7/2002 | Ishitoko et al. | 73/504.12 |
| 6,439,050 B1 * | 8/2002 | Musalem et al. | 73/504.12 |

FOREIGN PATENT DOCUMENTS

JP 9-14972 * 1/1997 ........... G01C/19/56

OTHER PUBLICATIONS

"Piezoelectric–Ceramic Cylinder Vibratory Gyroscope", by Abe et al., Jpn. J. Appl. Phys., vol. 31, (1992).
"Consideration On Equivalent Mechanical Circuits For Vibratory Gyroscope", by Kudo et al., IEEE Ultrasonics Symo., (1990).

(List continued on next page.)

Primary Examiner—Thomas M. Dougherty (57) ABSTRACT

Disclosed are coriolis force driven piezoelectric gyroscope systems which each comprise two substantially orthogonally oriented elements projecting from a mass. Each substantially orthogonally oriented element has a pair of electrodes present thereupon, wherein the electrodes in a pair thereof are oriented substantially parallel to one another. In use rotation about an axis oriented perpendicular to a plane formed by two substantially orthogonally oriented elements while an extension inducing driving voltage is applied across a pair of electrodes on one thereof. An output voltage, which is related to the rotation rate, is sensed across the pair of electrodes on the other substantially orthogonally oriented element.

10 Claims, 5 Drawing Sheets u:PRIMARY MOTION
v:SECONDARY MOTION

OTHER PUBLICATIONS

"Piezoelectric Vibratory Gyroscope Using Flexural Vibration Of A Triangular Bar", by Fujishima et al., IEEE Forth–Fifth Annual Symp. on Freq. Control, (1991).

"Mathematical Theory Of The Fork–Type Wave Gyroscope", IEEE International Frequency Control Symposium, (1995).

"LiTaO₃ Crystal Fork Vibratory Gyroscope" by Wakatsuki et al., IEEE Ultrasonics Symposium, (1994).

"Finite Element Analysis Of Single Crystal Tuning Forks For Gyroscopes", by Kudo et al., IEEE Intl. Freq. Control Symp., (1996).

"A Cylindrical Shell Piezoelectric Gyroscope", Yang, Intl. J. of App. Electromagnetics and Mechanics, 8, 259–271, (1997).

"The Dynamics Of A Thin Film Piezoelectric Cylinder Gyroscope", Burdess, Proc. Inst. Mech. Engrs. 200 (C4), 271–280 (1986).

"A Coupled Electromechanical Model of an Imperfect Piezoelectric Vibrating Cylindrical Gyroscope", Loveday, J. Intelligent Material Systems and Structures, 7, 44–53, (1996).

"Finite Element Simulation of Piezoelectric Vibrator Gyroscopes", Kagawa, IEEE Trans. on Ultrasonic Ferroelectrics and Freq. Control, 43, pp. 509–518, (1996).

"Gyroscope Effect in Surface Acoustic Waves", Lao, Proc. Ultrasonics Symp. pp. 678–691, (1980).

"Circulating Flexural Wave Rotation Rate Sensor", Tiersten, Proc. IEEE Ultrasonics Symposium, pp. 163–166, (1981).

"A Rotation Rate Sensor Based Upon a Rayleigh Resonator", Clark & Burdess, ASME J. App. Mech., 61, pp. 139–143, (1994).

"Vibrating Angular Rate Sensor May Threaten Gyroscope", Gates, Electronics, 41, pp. 130–134, (1968).

"Piezoelectric Vibratory Gyroscope Using Flexural Vibration of a Triangular Bar", Fujishima et al., Proc. IEEE 45th Annual Symp. on Frequency Control, pp. 261–265, (1991).

"Analysis on Vibrating Piezoelectric Beam Gyroscope", Chou et al., Int. J. of App. Electromagnetics in Materials, 2, pp. 227–241, (1991).

"Piezoelectric Beams and Vibrating Angular Rate Sensors", IEEE Trans. Ultrasonics, Ferroelectrics, and Freq. Control, 38, pp. 271–280, (1991).

"Three–Dimensional Finite Element Calculations of an Experimental Quartz Resonator Sensor", Reese et al., Proc. IEEE Ultrasonics Symp. pp. 419–422, (1989).

"Energy Trpping of Thickness=Shear Vibrations Excited by Parallel Electric Field and its Applications to Piezoelectric Vibratory Gyroscopes", Abe et al., Proc. IEEE Ultrasonics Symp., pp. 467–471, (1998).

"Analysis of Ceramic Thickness Shear Piezoelectric Gyroscopes", Yang, J. Accoust. Soc. Am., 102 pp. 3542–3548, (1997).

"The Dynamics of a Thin Piezoelectric Disk Gyroscope", Burdess et al., IEEE Trans. on Aerospace and Electronic Systems, AES–22, pp. 410–418, (1986).

"One–Dimensional Equations for a Piezoelectric Ring and Applications in a Gyroscope", Yang et al., IEEE Transactions on Ultrasonics, Ferroelectrics, and Frequency Control, 48(5), (2002).

"The Theory of a Piezoelectric Disc Gyroscope", Burdess et al., IEEE Trans. on Aerospace and Electronic Systems, vol. AES–22, No. 4 (1986).

* cited by examiner

PIEZOELECTRIC GYROSCOPE SYSTEM, AND METHOD OF USE

This Application Claims benefit of Co-Pending Provisional Application No. 60/295,534 Filed Jun. 04, 2001 and is a CIP of applications Ser. No. 09/271,791 Filed Mar. 18, 1999, (now U.S. Pat. No. 6,140,748); said priority being via Co-Pending application Ser. No. 09/659,624 Filed Sep. 11, 2000.

TECHNICAL FIELD

The present invention relates to piezoelectric systems, and more particularly to coriolis force driven piezoelectric gyroscope systems which each comprise two substantially orthogonally oriented elements projecting from a mass. Each substantially orthogonally oriented element has a pair of electrodes present thereupon, wherein the electrodes in a pair thereof are oriented substantially parallel to one another. The primary embodiment of said present invention system comprises one such system of substantially orthogonally oriented elements, with modified embodiments comprising a plurality of such systems in functional combination. In use a present invention system is caused to rotate about an axis oriented perpendicular to a plane formed by the substantially orthogonally oriented elements, while an extension inducing driving voltage is applied across a pair of electrodes on one substantially orthogonally oriented element. An output voltage, which is related to the rotation rate, is sensed across the pair of electrodes on the other orthogonally oriented element.

BACKGROUND

Piezoelectric gyroscopes are well known in the art. For instance, generally elongated rectangular solid shaped Piezoelectric gyroscopes which serve to produce a voltage at sensing electrodes thereof which is proportional to an angular rotation velocity of said piezoelectric-gyroscope about a longitudinally oriented axis therethrough are known, in which the mechanism of operation involves Coriolis force mediated flexure in a direction which is perpendicular to both said longitudinal axis, and a direction of an applied driving voltage effected flex.

One known embodiment of a piezoelectric gyroscope, as viewed in front elevational cross-section, typically has, at one longitudinally disposed side thereof, two vertically stacked, (ie. one atop the other), regions of vertically oriented polarized direction material sandwiched between driving voltage electrodes attached thereto at upper and lower surfaces. One of said vertically stacked regions of vertically oriented polarized direction material has an upward polarized direction and the other a downward polarized direction. On an opposite longitudinally disposed side thereof, and as viewed in side elevation there are present two adjacent regions of horizontally oriented polarized direction material, (ie. one in front of the other as viewed in frontal elevation), sandwiched between sensing voltage electrodes attached thereto at front and back vertically oriented surfaces. One said adjacent region of horizontally oriented polarized direction material having, as viewed from atop thereof, a horizontal laterally to the right projecting polarized and the other said adjacent region of horizontally oriented polarized direction material having a horizontal laterally to the left oriented polarized direction. That is, the polarized plane and polarized directions on said second longitudinally disposed side are simply rotated ninety (90) degrees, (eg. horizontally oriented), from the plane of the polarized directions, (eg. vertically oriented), on said first laterally disposed side about said longitudinally oriented axis therethrough.

Another prior art embodiment of a piezoelectric gyroscope is comprised of a long solid but flexible elongated rod with piezoelectric ceramics affixed thereto on side faces thereof. Said long solid but flexible rod can be triangular or rectangular in cross-section and have three or four electrodes mounted on side faces thereof. Where only three electrodes are present, both driving and sensing circuits share on of the electrodes. References which describe such piezoelectric gyroscope systems are:

"Vibrating Angular Rate Sensor May Threaten The Gyroscope", Gates, Electronics, 41, 103–134 (1968); and "Piezoelectric Vibratory Gyroscope Using Flexural Vibration Of A Triangular Bar", Fujishima et al., IEEE 45th Annual Symp. On Frequency Control, 261–265 (1991).

Another prior art embodiment of a piezoelectric gyroscope is comprised of a solid but flexible, long, circular cross-section, piezoelectric elongated rod, with multiple electrodes affixed on the-outer surface thereof. Such an embodiment is described in U.S. Pat. No. 5,336,960 to Shimizi et al., which is titled "Gyroscope Using Circular Rod Type Piezoelectric Vibrator".

Another prior art embodiment of a piezoelectric gyroscope is comprised of a short flexible tubular shaped element, to an outer surface of which are affixed numerous piezoelectric ceramics. Application of driving voltage across some electrodes thereof cause a shape change from essentially circular cross section toward essentially elliptical cross-section, which shape change, in combination with rotation effected Coriolis force, causes an output voltage to appear at other of said electrodes. Such a gyroscopic system is described in "The Dynamics Of A Thin Film Piezoelectric Cylinder Gyroscope", Burdess, Proc. Inst. Mech. Engrs. 200 (C4), 271–280 (1986).

Yet another prior art embodiment of a piezoelectric gyroscope is described in an article by the inventor herein, titled "A Cylindrical Shell Piezoelectric Gyroscope", Yang, Intl. J. of App. Electromagnetics and Mechanics, 8, 259–271, (1997). Said article describes a short tubular shaped piezoelectric gyroscope system in which radial and torsional vibration modes are utilized to realize a rotation detecting system.

Disclosed in a related Application by the present Inventor, (Ser. No. 09/271,791), now U.S. Pat. No. 6,140,748, is a piezoelectric gyroscope system comprising a generally longitudinally elongated three dimensional mass of piezoelectric material having first and second longitudinally disposed sides, said piezoelectric gyroscope system being distinguished in that a sensing electrode is present at one terminal end thereof, said sensing electrode being affixed so that it is oriented other than on a longitudinally oriented side of said piezoelectric gyroscope. Typically, said terminal end of said present invention piezoelectric gyroscope system, whereat said sensing electrode is affixed, is accurately described as oriented in a direction perpendicular to the direction of longitudinal elongation, and the generally longitudinally elongated three dimensional mass of piezoelectric material is a selected to be of a rectangular solid shape. Said invention couples the voltage amplification benefits of piezoelectric (Rosen) transformers to the angular velocity measuring capabilities of piezoelectric-gyroscopes, by placing a sensing electrode in a piezoelectric-gyroscope much as is done in piezoelectric-transformers, (eg. as viewed in elevation, at a vertically oriented end of a longitudinally disposed side of a present invention piezoelectric-gyroscope at which is present two regions of horizontally longitudinally oriented polarized direction material). That is, the two sensing electrodes in a conventional piezoelectric-gyroscope, described above as adjacent to regions of horizontally, laterally oriented polarized direction material, (ie. one in front of the other as viewed in frontal elevation), sandwiched between sensing voltage electrodes attached thereto at front and back surfaces, are, in the preferred embodiment of the present invention, replaced by a single electrode at a vertically oriented end of the longitudinally disposed side of the present invention piezoelectric-gyroscope at which is present the two adjacent regions of horizontally longitudinally oriented polarized direction material. Said single electrode can reference to one of the driving electrodes, or to a second sensing electrode. A preferred embodiment of said related invention Piezoelectric Gyroscope, which serves to couple the voltage amplification benefits of piezoelectric (Rosen) transformers to the angular velocity measuring capabilities of conventional piezoelectric gyroscopes, can be described as comprising a generally elongated, typically rectangular solid shaped block of piezoelectric material having first and second longitudinally disposed sides and a longitudinally oriented axis which projects essentially centrally therethrough from said first longitudinally disposed side to said second longitudinally disposed side thereof. At the first longitudinally disposed side thereof there are present two, vertically stacked, regions of oppositely oriented polarized direction material sandwiched between driving voltage electrodes. One of said vertically stacked regions of oppositely oriented polarized direction material has, for instance, an "upward" polarized direction and the other a "downward" polarized direction. And on the second longitudinally disposed side thereof there are two adjacent regions of oppositely oriented polarized direction material, one said adjacent region of oppositely oriented polarized direction material having, for instance, a longitudinally "to the right" projecting polarized and the other said adjacent region of oriented polarized direction material having a longitudinally "to the left" oriented polarized direction. The plane of the polarized directions on said second longitudinally disposed side is rotated ninety (90) degrees from the plane of the polarized directions on said first longitudinally disposed side. Said piezoelectric-gyroscope further has a sensing electrode present at a vertically oriented end of the second longitudinally disposed side of the present invention piezoelectric-gyroscope.

In another Patent Application by the same Inventor, Ser. No. 09/659,624, there is described a piezoelectric gyroscope system comprising a generally longitudinally elongated essentially tubular structure presenting with inner and outer annular region defining surfaces and first and second longitudinally disposed ends, said piezoelectric gyroscope system being distinguished in that:

a. an electrode is present on the inner surface thereof, and b. in that there are present four electrodes on the outer surface thereof spaced at substantially ninety degree intervals, and c. in that said generally longitudinally elongated essentially tubular structure, the annular region thereof of which is made of piezoelectric material which is radially polarized.

Note that the electrode which is present on the inner surface of the present invention piezoelectric gyroscope system is present to functionally serve as a second plate with respect to driving electrodes Said electrode is typically present on substantially the entire inner surface, which is to be interpreted based upon said functional purpose of said "inner electrode". Functionally, said inner electrode can be primarily present only directly opposed to said driving and sensing electrodes.

It is noted that the four electrodes on the outer surface thereof can alternatively be described as each being present in a separate quadrant, (as the piezoelectric gyroscope generally longitudinally elongated essentially tubular structure is viewed in cross-section), with at least the two "driving electrodes" thereof being substantially oriented at substantially 180 degrees with respect to one another. The sensing electrodes are, however, also preferably oriented at substantially 180 degrees with respect to one another to optimize sensed voltage magnitude.

In use said piezoelectric gyroscope is caused to rotate at an angular rotation velocity about said longitudinally oriented axis which projects essentially centrally therethrough from said first longitudinally disposed end to said second longitudinally disposed end, and a flex effecting voltage is applied across two electrodes oriented at substantially 180 degrees with respect to one another, (ie. driving electrodes), while an output voltage is sensed at the other two electrodes, (ie. sensing electrodes). The end result is that when both:

angular rotation velocity about said longitudinally oriented axis which projects essentially centrally therethrough from said first longitudinally disposed end to said second longitudinally disposed end, and flex effecting voltage is applied across the driving electrodes, it occurs that, through the mechanism of Coriolis force, another flex perpendicular to the voltage effected flex occurs and is related to said angular rotation velocity about said longitudinally oriented axis therethrough, appears across the two sensing electrodes which are oriented such that the "axis" thereof, (ie. the direction through the sensing electrodes and perpendicular thereto), is substantially perpendicular to both the axis of rotation and the "axis" of the driving electrodes.

It is also disclosed that the preferred piezoelectric material from which the generally longitudinally elongated essentially tubular structure is made is ceramic, because, as alluded to, ceramic is inherently isotropic and it is relatively easy to induce polarized regions therein. However, use of any functional material is to be considered within the scope of the present invention, with another very relevant candidate being, for instance, lithium niobate.

A tuning-fork shaped piezoelectric gyroscope system can also be formed from said essentially tubular structure made of piezoelectric material presenting with inner and outer annular region defining surfaces, first and second legs thereof being projected from a base, preferably formed from a substantially "U" shape tubular structure, said tuning-fork shaped piezoelectric gyroscope system again being distinguished in that:

an electrode is present on the inner surface thereof, and in that there are present two electrodes on the outer surface of each leg, said two electrodes being positioned at substantially 180 degrees to one another and such that an axis through the electrodes on one leg is oriented essentially 90 degrees to an axis through the electrodes on the other leg, and in that said tubular structure annular region piezoelectric material is substantially radially polarized;

such that causing said piezoelectric gyroscope to rotate about said base and applying a flex effecting voltage across two "driving" electrodes oriented at substantially 180 degrees with respect to one another on one leg causes an output voltage to develop which can be sensed at the two "sensing" electrodes on the other leg.

A method of monitoring an angular rotation velocity comprises the steps of:

a. providing a present invention piezoelectric gyroscope as just described;

said method further comprising in a functional order the steps of:

b. causing said piezoelectric gyroscope to rotate about a longitudinally oriented axis, (eg. an axis which projects essentially centrally therethrough from said first longitudinally disposed end to said second longitudinally disposed end and applying a flex effecting voltage across two electrodes oriented at substantially 180 degrees with respect to one another, (ie. driving electrodes), such that an output voltage is developed at the other two electrodes, (ie. driving electrodes).

c. monitoring said developed output voltage at said other two electrodes, (ie. sensing electrodes), said monitored output voltage being related to said angular velocity of rotation about said longitudinally oriented axis which projects essentially centrally therethrough from said first longitudinally disposed end to said second longitudinally disposed end.

Generally, in use Piezoelectric gyroscopes are caused to rotate at an angular rotation velocity about a typically longitudinally oriented axis, which projects essentially centrally therethrough from said first longitudinally disposed, side to said second longitudinally disposed side, and a flex effecting voltage is applied across the driving electrodes while an output voltage is sensed across said sensing electrodes. When both angular rotation velocity about said longitudinally oriented axis therethrough, and flex effecting voltage is present across the driving electrodes, it occurs that, (through the mechanism of Coriolis force), a voltage appears at the sensing electrodes which is related to said angular rotation velocity about said longitudinally oriented axis therethrough. Where the angular rotational velocity about said longitudinally oriented axis therethrough is at least an order of magnitude less than is the natural vibrational frequency of the piezoelectric gyroscope material, the output voltage at the sensing electrodes is typically directly proportional to said angular rotational velocity.

As mentioned, it is also known that materials which are well suited for use in Piezoelectric-transformers and gyroscopes are ceramics in which can be effected regions of poled direction by a "Poling procedure". Ceramics are inherently isotropic so, that polarization can be determined by application of an electric field across the materials in excess of the coercive field thereof, (which is typically on the order of 1 MV/m), while raising the temperature of the material above the Curie point, and then cooling the material below this point to lock-in the induced domain structure. A reference which describes this procedure is titled "Smart Structures and Materials", Culshaw, Artech House, (1996).

A search of Patents which describe piezoelectric gyroscopes provided nothing obviating of the present invention system. Identified Patents are:

A Patent to Wirt, U.S. Pat. No. 5,495,760 describes a gyroscope with one or more drive cylinders which have single electrodes on the inside and on the outside diameters.

A Patent to Kumada, U.S. Pat. No. 5,912,528 describes a vibrating gyroscope which includes a ring-shaped vibrator having a node.

A Patent to Kananami et al., U.S. Pat. No. 5,874,674 describes a piezoelectric vibratory gyroscope having non-parallel sides.

Additional known Patents which describe angular or rotation measuring systems comprised of piezoelectric materials are:

U.S. Pat. No. 3,143,889 to Simmons et al., which provides for electrodes to be present on a piezoelectric material on top and bottom surfaces and on front and back surfaces.

U.S. Pat. No. 3,258,617 to Hart describes a piezoelectric system which positions sensing electrodes, (see (23) and (24) of FIG. 2 therein), at both the ends of a preferably rectangular shaped mass of piezoelectric material.

U.S. Pat. No. 3,141,100 to Hart describes a rather complex system comprised of a plurality of crystal quartz elements.

U.S. Pat. No. 5,837,895 describes a vibrating gyroscope including a piezoelectric substrate having two divided electrodes on one main surface, and a single electrode on the other main surface.

U.S. Pat. No. 5,942,839 describes a piezoelectric vibratory gyroscope having three parallel vibrator arms.

U.S. Pat. No. 5,912,524 to Ohnishi et al. describes a vibratory gyroscope.

U.S. Pat. No. 5,847,487 to Maeno describes a cross-shaped vibration gyroscope.

U.S. Pat. No. 5,945,600 to Touge et al., describes an angular rate detector.

U.S. Pat. No. 5,767,405 to Bernstein et al., describes a tuning fork gyroscope.

U.S. Pat. No. 5,691,595 to Tomikawa et al., describes a vibratory gyroscope including a planar elastic vibrator having vibrator piezoelectric material layers on the front and back sides.

Additionally:

U.S. Pat. No. 3,736,446 to Berlincourt et al., describes a piezoelectric transformer with an electrode (17) at an end of a preferably rectangular shaped mass of piezoelectric material. This Patent also shows a system structure with various regions of polarized direction material present therein. Reference to FIG. 1 therein shows two regions (13) and (14) of oppositely directed vertical polarized at the leftmost side thereof as viewed in said FIG. 1, and with a region of horizontally polarized material at the right side (12) as so viewed.

U.S. Pat. No. 5,504,384 to Lee et al. shows another piezoelectric transformer with electrodes (11) and (12) at ends of an essentially rectangular shaped block of piezoelectric material. Also described are various regions of polarized material present therein. Reference to FIG. 2 in said 384 Patent shows horizontally oppositely directed regions of piezoelectric material at laterally disposed ends of the essentially rectangular shaped block of piezoelectric material, with oppositely directed vertically poled regions of piezoelectric material centrally located therewithin.

Articles which describe conventional Piezoelectric transformers and gyroscopes are:

A paper titled "Piezoelectric-Ceramic Cylinder Vibratory Gyroscope", by Abe et al., Jpn. J. Appl. Phys., Vol. 31, (1992), describes a piezoelectric gyroscope with a cylindrical structure.

Another paper titled "Consideration On Equivalent Mechanical Circuits For Vibratory Gyroscope", by Kudo et al., IEEE Ultrasonics Symp., (1990) describes equations of gyro-motion and proposes many vibratory gyroscopes including one utilizing rotation motion in a double resonate vibrator system.

Another paper titled "Piezoelectric Vibratory Gyroscope Using Flexural Vibration Of A Triangular Bar", by Fujishima et al., IEEE Forth-Fifth Annual Symp. on Freq. Control, (1991), describes basic principals of a piezoelectric vibratory gyroscope and discloses development of a unique triangular bar flexural vibratory piezoelectric gyroscope.

A paper titled "Mathematical Theory Of The Fork-Type Wave Gyroscope", Ulitko, IEEE International Frequency Control Symposium, (1995) describes operation of Fork-type gyroscopes.

Another paper which describes Fork-type Vibratory Gyroscopes is titled "LiTaO$_3$ Crystal Fork Vibratory Gyroscope" by Wakatsuki et al., IEEE Ultrasonics Symposium, (1994).

Another paper titled "Finite Element Analysis Of A Quartz Angular Rate Sensor", ANSYS Conference Proceedings, 3.35–48, (1989) is further cited as is a paper titled "Finite Element Analysis Of Single Crystal Tuning Forks For Gyroscopes", by Kudo et al., IEEE Intl. Freq. Control Symp., (1996), describes the results of applying finite element analysis to tuning fork gyroscopes.

Papers which describe piezoelectric gyroscopes with small resonant frequencies are "A Review of Vibratory Gyroscope", Burdess et al., Engineering Science and Education Journal, pp. 249–254, (1994); and "Micromachined Gyroscopes", Soderkvist, Sensors and Actuators A, 43, pp 65–71, (1994).

Discussion of dependence of the relationship of operating characteristics of piezoelectric gyroscopes to physical and geometrical parameters thereof, explicitly shown in simple expressions, are found in:

"A Coupled Electromechanical Model of an Imperfect Piezoelectric Vibrating Cylindrical Gyroscope", Loveday, J. Intelligent Material Systems and Structures, 7, 44–53, (1996);

and in

"Finite Element Simulation of Piezoelectric Vibrator Gyroscopes", Kagawa, IEEE Trans. on Ultrasonic Ferroelectrics and Freq. Control, 43, pp. 509–518, (1996).

Rotation induced frequency shift, which can be linear with respect to rotation rate and can therefore be used to detect the rotation rate, are further discussed in:

"Gyroscope Effect in Surface Acoustic Waves", Lao, Proc. Ultrasonics Symp. pp. 678–691, (1980);

"Circulating Flexural Wave Rotation Rate Sensor", Tiersten, Proc. IEEE Ultrasonics Symposium, pp. 163–166, (1981);

"A Rotation Rate Sensor Based Upon a Rayleigh Resonator", Clark & Burdess, ASME J. App. Mech., 61, pp. 139–143, (1994).

Other Articles of which the Applicant is aware, which describe Piezoelectric Gyroscopes which are more complex that the present invention systems are:

"Vibrating Angular Rate Sensor May Threaten Gyroscope", Gates, Electronics, 41, pp.130–134, (1968);

"Piezoelectric Vibratory Gyroscope Using Flexural Vibration of a Triangular Bar", Fujishima et al., Proc. IEEE 45th Annual Symp. on Frequency Control, pp. 261–265, (1991);

"Analysis on Vibrating Piezoelectric Beam Gyroscope", Chou et al., Int. J. of App. Electromagnetics in Materials, 2, pp. 227–241, (1991);

"Piezoelectric Beams and Vibrating Angular Rate Sensors", IEEE Trans. Ultrasonics, Ferroelectrics, and Freq. Control, 38, pp. 271–280, (1991);

"Three-Dimensional Finite Element Calculations of an Experimental Quartz Resonator Sensor", Reese et al., Proc. IEEE Ultrasonics Symp. pp419–422, (1989);

"Energy Trpping of Thickness Shear Vibrations Excited by Parallel Electric Field and its Applications to Piezoelectric Vibratory Gyroscopes", Abe et al., Proc. IEEE Ultrasonics Symp., pp. 467–471, (1998);

"Analysis of Ceramic Thickness Shear Piezoelectric Gyroscopes", Yang, J. Accoust. Soc. Am., 102 pp. 3542–3548, (1997);

"A Vibrating Piezoelectric Ceramic Shell as a Rotation Sensor", Yang et al., Smart Materials and Structures, 9, pp. 445–451, (1998);

"The Dynamics of a Thin Piezoelectric Disk Gyroscope", Burdess et al., IEEE Trans. on Aerospace and Electronic Systems, AES-22, pp. 410–418, (1986);

"The Dynamics of a Piezoelectric Cylinder Gyroscope", Burdess et al., Proc. Inst. Mech. Engrs., 200 (C4), pp. 271–280, (1986);

"One-Dimensional Equations for a Piezoelectric Ring and Applications in a Gyroscope", Yang et al., IEEE Transactions on Ultrasonics, Ferroelectrics, and Frequency Control ????;

"Acoustic Fields and Waves in Solids", Vol. 1, John Wiley & Sons, New York, (1973) pp. 357–382;

"Design or Resonant Piezoelectric Devices", Holland et al., MIT Press, Cambridge, (1969).

Even in view of the identified known prior art, there remains need for new piezoelectric gyroscope systems which provide angular velocity measuring capability.

DISCLOSURE OF THE INVENTION

The present invention is a piezoelectric gyroscope system comprising two substantially orthogonally oriented elements, (refered to in the Detailed Description Section of this Disclosure more simply as "rods"), each of which project from a mass. Each said substantially orthogonally oriented element has a pair of electrodes present thereupon, with the electrodes in a pair thereof being oriented substantially parallel to one another. In use said piezoelectric system is caused to rotate about an axis oriented perpendicular to a plane formed by said two substantially orthogonally oriented elements while a extension inducing driving voltage is applied across a pair of electrodes on one thereof, to the end that an output voltage which is related to the rotation rate, is sensed across the pair of electrodes on the other substantially orthogonally oriented element.

A preferred arrangement provides that the rotation about the axis oriented perpendicular to a plane formed by said two substantially orthogonally oriented elements be centered at the mass from which the two substantially orthogonally oriented elements project.

The present invention further comprises a multiple piezoelectric gyroscope system comprising a plurality of piezoelectric gyroscope systems, wherein each thereof comprises: first and second substantially orthogonally oriented elements projecting from a mass, each said substantially orthogonally oriented element having a pair of electrodes present thereupon, wherein each electrode in a pair thereof are oriented substantially parallel to one another; such that in use said piezoelectric system is caused to rotate about an axis oriented perpendicular to a plane formed by said two substantially orthogonally oriented elements while an extension inducing driving voltage is applied across a pair of electrodes on one thereof, to the end that an output voltage which is related to the rotation rate, is sensed across the pair of electrodes on the other substantially orthogonally oriented element. The piezoelectric gyroscope system is oriented such that the first and second substantially orthogonally oriented elements oft each thereof are all in a common plane;

and the electrodes on the first of each said substantially orthogonally oriented elements in each said piezoelectric gyroscope have electrical connection with the first substantially orthogonally oriented elements on the other piezoelectric gyroscopes. Further, the electrodes on the second of each said substantially orthogonally oriented elements in each said piezoelectric gyroscope have electrical connection with the second substantially orthogonally oriented elements on the other piezoelectric gyroscopes. In use said multiple piezoelectric system is caused to rotate about an axis oriented perpendicular to the common plane formed by all said two substantially orthogonally oriented elements, while an extension inducing driving voltage is applied across all electrically interconnected electrode pairs on the first elements thereof, to the end that an output voltage which is related to the rotation rate, is sensed across the electrically interconnected electrode pairs on the second substantially orthogonally oriented elements thereof.

Said multiple piezoelectric gyroscope system preferably comprises four piezoelectric gyroscope systems, said four piezoelectric gyroscope systems being oriented with respect to one another such that the masses thereof are positioned as the four corners of a rectangle, and such that the orthogonally related elements are oriented along sides thereof. The preferred rectangle is a square.

A method of developing a voltage which is proportional to a rotation rate, comprises the steps of:

a. providing a piezoelectric gyroscope system comprising two substantially orthogonally oriented elements projecting from a mass as described above;

b. causing said piezoelectric gyroscope to rotate about an axis oriented perpendicular to a plane formed by said two substantially orthogonally oriented elements;

c. applying an extension inducing driving voltage is applied across a pair of electrodes on one substantially orthogonally, oriented element;

to the end that an output voltage which is related to the rotation rate, is sensed across the pair of electrodes on said other substantially orthogonally oriented element.

A method of developing a voltage which is proportional to a rotation rate, comprises the steps of:

a. providing at least two piezoelectric gyroscope systems as described above and functionally interconnecting them, b. causing said piezoelectric gyroscope which is comprised of at least two piezoelectric gyroscope systems, to rotate about an axis oriented perpendicular to a plane formed by said two substantially orthogonally oriented elements;

c. applying an extension inducing driving voltage across a pair of electrodes on one substantially orthogonally oriented element of each of said at least two piezoelectric gyroscope systems;

to the end that an output voltage which is related to the rotation rate, is sensed across functionally interconnected pairs of electrodes on said other substantially orthogonally oriented elements of each of said at least two piezoelectric gyroscope systems.

The present invention will be better appreciated, by reference to the Detailed Description Section of this Disclosure, with appropriate reference to the accompanying Drawings.

DETAILED DESCRIPTION

Figure 1:
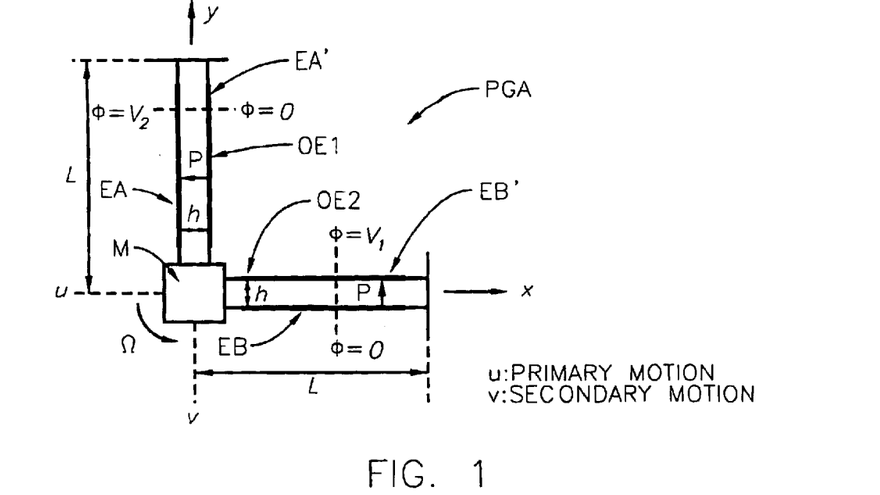
FIG. 1 shows piezoelectric gyroscope system comprising two substantially orthogonally oriented elements projecting from a mass, each said substantially orthogonally oriented element having a pair of electrodes present thereupon.

Turning now to FIG. 1, there is shown a present invention Piezoelectric Gyroscope System (PGA) comprising two orthogonally oriented elements (OE1) (OE2) projecting from a mass (M). It is noted that the orthogonally oriented elements (OE1) and (OE2) are each of length (L) and width (h), where (L>>h). Note that said orthogonally oriented element (OE1) has a pair of electrodes (EA) and (EA') present thereupon, and that said orthogonally oriented element (OE2) has a pair of electrodes (EB) and (EB') present thereupon. Each electrode in a pair thereof, lie. (EA) & (EA') and (EB) & (EB')) are oriented substantially parallel to one another. In use said piezoelectric system (PGA) is caused to rotate about an axis oriented perpendicular to a plane, (eg. the plane of the paper as (PGA) is shown in FIG. 1), formed by said two orthogonally oriented elements (OE1) & (OE2), while an extension inducing driving voltage ($V_1$) is applied across a pair of electrodes, (shown as (EB) & (EB') on (OE2), to the end that an output voltage ($V_2$) which is related to the rotation rate ($\Omega$), is sensed across the pair of electrodes (EA)-(EA') on orthogonally oriented element (OE1). Note that the extension driving voltage could be applied across electrodes (EA) and (EA') and the output voltage monitored across (EB) & (EB').

Figure 2:
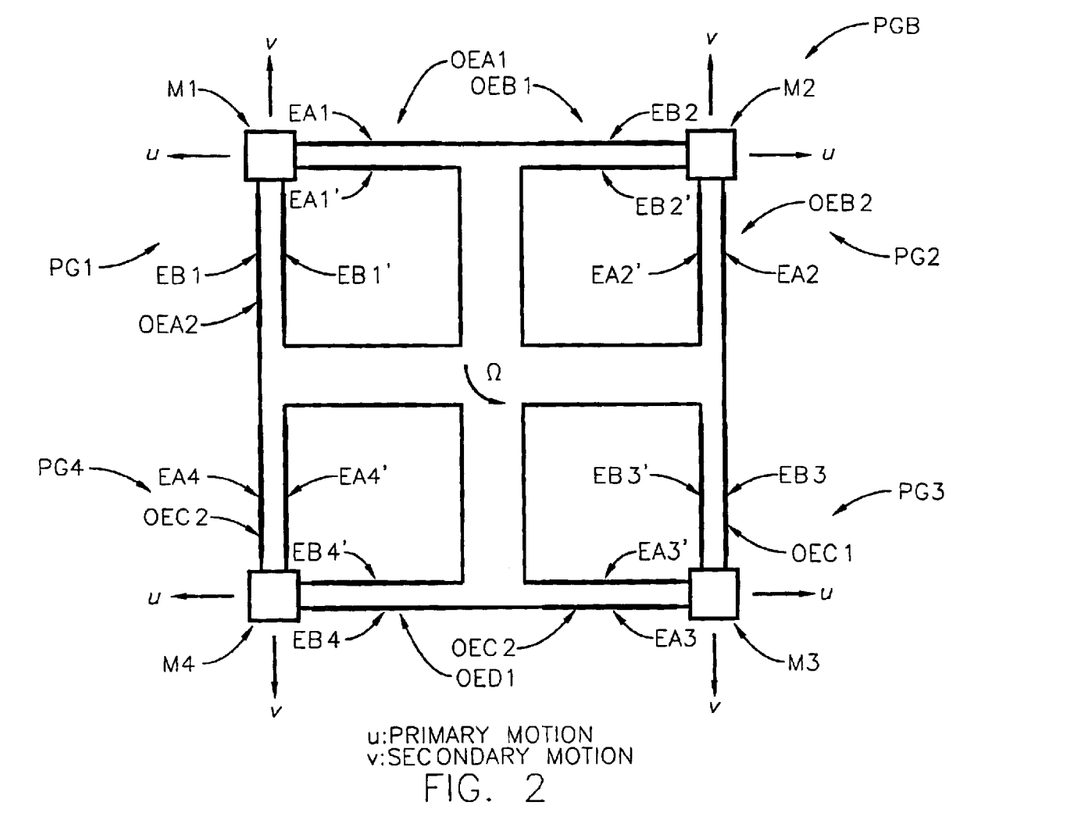
FIG. 2 shows four piezoelectric gyroscope systems which are oriented to form a square, wherein each piezoelectric gyroscope system comprises two substantially orthogonally oriented elements projecting from a mass, each said substantially orthogonally oriented element having a pair of electrodes present thereupon.

FIG. 2 shows a present invention a multiple piezoelectric gyroscope system (PGB) comprising a plurality of piezoelectric gyroscope systems ((PG1) (PG2) (PG3) (PG4)), wherein each of said piezoelectric gyroscope systems comprises first and second orthogonally oriented elements:

| | |
|---|---|
| OEA1 | OEA2 |
| OEB1 | OEB2 |
| OEC1 | OEC2 |
| OED1 | OED2 | which, as shown, project from a mass, said masses being, respectively:

M1
M2
M3
M4.

FIG. 2 also shows that each orthogonally oriented element have a pair of electrodes present thereupon, which are respectively:

| EA1 | EA1' | and | EB1 | EB1' |
| EA2 | EA2' | and | EB2 | EB2' |
| EA3 | EA3' | and | EB3 | EB3' |
| EA4 | EA4' | and | EB4 | EB4' | wherein each electrode in a pair thereof are oriented substantially parallel to one another.

In use said piezoelectric system is caused to rotate about an axis, (located at centrally at ($\Omega$) in FIG. 2), oriented perpendicular to a plane formed by said two orthogonally oriented elements while an extension inducing driving voltage is applied across electrically coupled pairs of electrodes:

| EA1 | EA1' |
| EB2 | EB2' |
| EA3 | EA3' |
| EB4 | EB4' | to the end that an output voltage which is related to the rotation rate, is sensed across electrically couple pairs of electrodes;

| EB1 | EB1' |
| EA2 | EA2' |
| EB1 | EB3' |
| EA4 | EA4' |

Note that said piezoelectric gyroscope system (PGB) is oriented such that all orthogonally oriented elements of each thereof are all orthogonal components:

| OEA1 | OEA2 |
| OEB1 | OEB2 |
| OEC1 | OEC2 |
| OED1 | OED2 | are oriented in a common plane, which is that of the paper surface in FIG. 2.

In use said multiple piezoelectric system (PGB) is caused to rotate about a centrally located axis, (located at ($\Omega$)) in FIG. 2, which axis is oriented perpendicular to the common plane formed by all said two orthogonally oriented elements as identified above, while, as described above, an extension inducing driving voltage is applied across all electrically interconnected driving electrode pairs as identified above, to the end that an output voltage which is related to the rotation rate, is sensed across the electrically interconnected sensing electrode pairs, as identified above.

GOVERNING EQUATIONS OF SIMPLE PIEZOELECTRIC GYROSCOPE

To provide insight to the operation of a present invention piezoelectric gyroscope system as shown in FIG. 1, it should be considered that said piezoelectric gyroscope system can be realized as two rods (OE1) and (OE2) of identical length (L) and width (h), and of unit thickness, which project from a mass (M). Each rod is polarized in its transverse direction, and are electroded at lateral surfaces thereof as shown by the thick lines identified as (EA) (EA') (EB) and (EB'). Under a time harmonic voltage $V_1(t)$, the rod along the "x" direction is driven into extensional vibrations. Then, if the whole system is rotating about the normal of the "x"-"y" plane at a constant angular rate ($\Omega$), it can be shown that along the "y" direction there will be a voltage output $V_2(t)$ which is proportional to ($\Omega$) and therefore can be used to detect ($\Omega$).

Consider the case wherein the rods (OE1) and (OE2) are long and thin such that L>>h. Flexible rigidity for such rods is small for such rods and as a result they do not significantly resist bending, but the extensional rigidity is not so small that they cannot provide extensional forces. For the case where the Mass (M) is much larger than that of the rods (OE1) and (OE2) so that inertial effects thereof can be ignored, the behavior of said rods (OE1) and (OE2) is effectively that of two elastic springs as modified by the effects of piezoelectric coupling.

In what follows consider that u(t) and v(t) are the displacements of (M) in "x" and "y" directions. Further, for each rod (OE1) and (OE2) a local coordinate system with x1 being the axis along the rod axis, and with the x3 axis being along the poling direction.

Considering the rod along the "x" direction first, and neglecting the dynamic effect in the beam due to inertia, the axial strain in the rod can be written as:

$$S_1 = -u/L. \qquad 1$$

With respect to the local coordinate system, the electric field corresponding to the electrode configuration in FIG. 1 can be written as:

$$E_1 = E_2 = 0; \text{ and } E_3 = -V_1/h; \qquad 2$$

where the driving voltage $V_1$ is considered known and is time harmonic. For thin rods in extension, the dominating stress component is the axial stress component $T_1$. All other stress components can be treated as equal to 0.0. Under the identified stress and electric field conditions, the constitutive relations for polarized ceramics take the following form:

$$S_1 = s_{11} T_1 + d_{31} E_3, \qquad 3$$

$$D_3 = d_{31} T_1 + \varepsilon_{33} E_3,$$

(see "Acoustic Fields and Waves in Solids", Auld, Vol 1, John Wiley & Sons, New York, 1973, pp 357–382),
where $D_3$ is the component of the electric displacement vector in the local coordinate system $s_{11}$, $d_{31}$, and $\varepsilon_{33}$ are relevant elastic, piezoelectric and dielectric constants. From Eqs. 3, $T_1$ and $D_3$ can be expressed in terms of $S_1$ and $E_3$ as:

$$T_1 = \frac{1}{s_{11}} S_1 - \frac{d_{31}}{s_{11}} E_3 = -\frac{1}{s_{11}} \frac{u}{L} + \frac{d_{31}}{s_{11}} \frac{V_1}{h}, \qquad 4$$

-continued
$$D_3 = \frac{d_{31}}{s_{11}}S_1 + \bar{\varepsilon}_{33}E_3 = -\frac{d_{31}}{s_{11}}\frac{u}{L} - \bar{\varepsilon}_{33}\frac{V_1}{h},$$

where Eqs (1) and (2) have been used, and where:

$$\bar{\varepsilon}_{33} = \varepsilon_{33}(1-k_{31}^2), k_{31}^2 = d_{31}^2/(\varepsilon_{33}s_{11}). \qquad 5$$

The axial force in the rod and the electric charge on the electrode (EB') at the upper surface of the rod (OE2) are given by:

$$F_1 = T_1 h = -Ku + \frac{d_{31}}{s_{11}}V_1, \qquad 6$$

$$Q_1 = -D_3 L = \frac{d_{31}}{s_{11}}u + C_0 V_1,$$

where $$K = \frac{h}{s_{11}L}, \quad C_0 = \frac{\bar{\varepsilon}_{33}L}{h}, \qquad 7$$

represent the effective elastic stiffness and the static capacitance of the rod. The electric current on the electrode is related to the charge by:

$$I_1 = -\dot{Q}_1 = -\frac{d_{31}}{s_{11}}\dot{u} - C_0 \dot{V}_1. \qquad 8$$

Similarly, for rod (OE1) along the "y" direction. the axial force and electric current are given by:

$$F_2 = -Kv + \frac{d_{31}}{s_{11}}V_2, \qquad 9$$

$$I_2 = -\frac{d_{31}}{s_{11}}\dot{v} - C_0 \dot{V}_2.$$

In gyroscope applications usually neither $V_2$ or $I_2$ is known and the output electrodes across the beam along the "y" direction are connected by an electric circuit. For the time harmonic case the following circuit condition holds:

$$I_2 = V_2/Z, \qquad 10$$

where Z is the impedance of the output circuit (also called the load), which depends on the structure of the output circuit and in general is also a function of the frequency of the time harmonic motion. In the special causes when Z=0.0 or we have shorted or open output circuit conditions with $V_2$=0.0 or $I_2$=0.0.

For small displacements of (M) in the co-rotating coordinate system, the equations of motion are:

$$F_1 = M(\ddot{u} - 2\Omega\dot{v} - \Omega^2 u), \qquad 11$$
$$F_2 = M(\ddot{v} + 2\Omega\dot{u} - \Omega^2 v),$$

where Coriolis and centrifugal accelerations are included.

Time Harmonic Solutions

Complex notation:

$$(u,v,V_1,V_2,I_1,I_2) = (\bar{u},\bar{v},\bar{V}_1,\bar{V}_2,\bar{I}_1,\bar{I}_2)e^{i\omega t}. \qquad 12$$

is employed for analysis of time harmonic motions. Substituting Eqn. 12 into Eqns. 11 and 10, the following equations are achieved:

$$[M(\omega^2 + \Omega^2) - K]\bar{u} + 2i\omega\Omega M\bar{v} = -\frac{d_{31}}{s_{11}}\bar{V}_1, \qquad 13$$

$$-2i\omega\Omega M\bar{u} + [M(\omega^2 + \Omega^2) - K] + \frac{d_{31}}{s_{11}}\bar{V}_2 = 0,$$

$$\frac{d_{31}}{s_{11}}\bar{v} + C_0\left(1 + \frac{Z_0}{Z}\right)\bar{V}_2 = 0,$$

where:

$$Z_0 = \frac{1}{i\omega C_0}, \qquad 14$$

Solving Eqn. 13 provides displacements, output voltage and current driving current as:

$$\frac{\bar{u}}{L} = -\frac{1}{\Delta}\left[\omega^2 + \Omega^2 - \omega_0^2\left(1 + \frac{k_{31}^2}{1-k_{31}^2}\frac{Z}{Z+Z_0}\right)\right]\omega_0^2 d_{31}\frac{\bar{V}_1}{h}, \qquad 15$$

$$\frac{\bar{v}}{L} = -\frac{1}{\Delta}2i\omega\Omega\omega_0^2 d_{31}\frac{\bar{V}_1}{h},$$

$$\frac{\bar{V}_2}{\bar{V}_1} = \frac{1}{\Delta}2i\omega\Omega\omega_0^2\frac{k_{31}^2}{1-k_{31}^2}\frac{Z}{Z+Z_0},$$

$$\frac{-\bar{I}_1}{\bar{V}_1/Z_0} = 1 - \frac{1}{\Delta}\frac{k_{31}^2}{1-k_{31}^2}\omega_0^2\left[\omega^2 + \Omega^2 - \omega_0^2\left(1 + \frac{k_{31}^2}{1-k_{31}^2}\frac{Z}{Z+Z_0}\right)\right],$$

$$\frac{\bar{I}_2}{\bar{V}_1/Z_0} = \frac{1}{\Delta}2i\omega\Omega\omega_0^2\frac{k_{31}^2}{1-k_{31}^2}\frac{Z_0}{Z+Z_0},$$

where:

$$\omega_0^2 = \frac{K}{M}, \qquad 16$$

$$\Delta = (\omega^2 + \Omega^2 - \omega_0^2)\left[\omega^2 + \Omega^2 - \omega_0^2\left(1 + \frac{k_{31}^2}{1-k_{31}^2}\frac{Z}{Z+Z_0}\right)\right] - 4\omega^2\Omega^2.$$

It is noted that $\omega_0$ is the natural frequence for the extensional motion of the beam-mass system in the "x" or "y" direction when there are no rotation and piezoelectric coupling. Also note that $$\Delta = 0$$

determines the resonant frequencies of the rotating system. Additional discussion of the dependence of all physical and geometrical parameters, explicitly shown in simple expressions, are found in:

"A Coupled Electromechanical Model of an Imperfect Piezoelectric Vibrating Cylindrical Gyroscope", Loveday, J. Intelligent Material Systems and Structures, 7, 44–53, (1996);

and in

"Finite Element Simulation of Piezoelectric Vibrator Gyroscopes", Kagawa, IEEE Trans. on Ultrasonic Ferroelectrics and Freq. Control, 43, 509–518, (1996).

Analysis of the Gyroscope

As an example, rods can be made of polarized ceramics PZT-5H with characteristics:

$$\rho = 7500 \text{ kg/m}^3,$$

$$s_{11} = 16.5 \times 10^{-12} \text{ m}^2/\text{N}, \quad d_{31} = -274 \times 10^{-12} \text{ C/N},$$

$$\varepsilon_{33} = 3400\varepsilon_0, \quad \varepsilon_0 = 8.854 \times 10^{-12} \text{ farads/m}.$$

$M=2\rho Lh$ is used in the following calculations. This effectively concentrates the mass of the two rods into M. Damping is introduced by allowing the relevant elastic constants to assume complex values. The real elastic constants $s_{pq}$ in the above expressions are replaced by $s_{pq}(1-iQ^{-1})$, where the value of the real number Q for ceramics is usually on the order of $10^2$ to $10^3$. In what follows Q is set to $10^2$. Elastic constants of the rods are allowed to assume complex values, $\omega_0$ in Eqns 15 and 16 and the equations which follow also become complex as a result. However, when used as a normalizing factor for ($\Omega$) or $\omega_0$, the results shown in FIGS. 3–9 are calculated from real elastic constants as a real number.

Free Vibration Analysis

For free vibrations $\overline{V}_1$ is set to 0.0, ($\overline{V}_1$=0). This is physically equivalent to shorting the driving electrodes. When this is done, Eqn 13 reduces to a system of homogeneous equations for $\overline{U}_1$, $\overline{U}_2$ and $\overline{V}_2$. For non-trivial solutions of the homogeneous form of Eqn. 13, the determinate of the coefficients matrix must vanish, leading to $$\Delta = 0. \qquad 18$$

as a frequency equation.

Eq. 18, where $\Delta$ is given by Eqn 16(2), can be formally solved for the resonate frequence $\omega$, yielding:

$$\omega^2 + \left(1 + \frac{1}{2}\lambda\right)\omega_0^2 + \Omega^2 \pm \frac{1}{2}\lambda\omega_0^2\sqrt{1 + \frac{16 + 8\lambda}{\lambda^2}\frac{\Omega^2}{\omega_0^2}}, \qquad 19$$

where:

$$\lambda = \frac{k_{31}^2}{1 - k_{31}^2}\frac{Z}{Z + Z_0}. \qquad 20$$

Equation 19 is not, strictly speaking, a solution of the resonant frequency of Eqn 18, because $\lambda$ is a function of Z and hence and hence a function of $\omega$.

In the special case of the shorted receiving electrodes Z=0.0 and $\lambda$=0.0. Then Eqn. 19 reduces to:

$$\omega = \omega_0 \pm \Omega, \qquad 21$$

which is a solution to Eqn. 18. It is noted that Eqn. 21 shows that rotation induced frequency shift might be linear in the rotation rate and can therefore be used to detect the rotation rate. In fact, there exist angular rate sensors based on this mechanism Further discussion thereof is found in:

"Gyroscope Effect in Surface Acoustic Waves", Lao, Proc. Ultrasonics Symp. pp 678–691, (1980);

"Circulating Flexural Wave Rotation Rate Sensor", Tiersten, Proc. IEEE Ultrasonics Symposium, pp 163–166, (1981);

"A Rotation Rate Sensor Based Upon a Rayleigh Resonator", Clark & Burdess, ASME J. App. Mech., 61, pp. 139–143, (1994).

Figure 3:
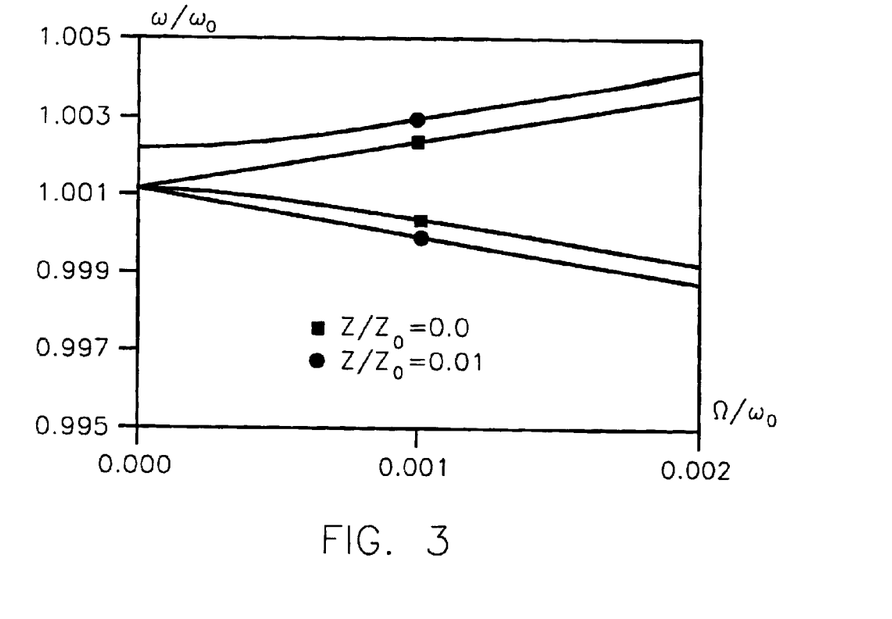
FIG. 3 shows dependence of resonant frequencies of a piezoelectric gyroscope as a function of the rotation rate.

Continuing, when the sensor electrodes are open, Z=∞, $\lambda = k_{15}^2/(1-k_{31}^2)$. Eqn. 18 represents a solution to Eqn 18. Piezoelectric gyroscopes usually work under the condition that $\Omega \ll \omega_0$. From Eqn 19 it is seen that, for small ($\Omega$) and open electrodes, the effect of ($\Omega$) on $\omega$ is quadratic. This is different from the special case of shorted sensing electrodes as shown by Eqn. 21. If the output circuit is essentially capacitive with a capacitance C, the Impedance $Z=1/(i\omega C)$ and $Z_0/Z = C/C_0$ which is a real number independent of $\omega$. In this case Eqn 19 also represents a frequency solution to Eqn. 18 from which relations of $\omega$ as a function of ($\Omega$), Z and other parameters can be found. Considering $Z_0/Z$ to be real, the relation of resonant frequency $\omega$ versus ($\Omega$) for $Z/Z_0$= 0.0. and 0.01 is plotted in FIG. 3. FIG. 3 shows that for each value of Z, there are two resonant frequencies which are due to two modes of extensional deformation of said rods. For the case of shorted receiving electrodes (Z=0.0), there are no electric fields in the rod along the "y" direction because the driving electrodes are also shorted. In this case a "piezoelectric stiffening" effect related to electric fields does not exist. Therefore the two resonant frequencies are the same when there is no rotation. However, rotation will cause these two frequencies to split. When the sensing electrodes are not shorted (Z≠0), there is an electric field in the rod along the "y" axis, which causes stiffening of the material and hence higher resonant frequency. Even when the structure is not rotating, the two extensional frequencies-are different as shown in FIG. 3.

Figure 4:
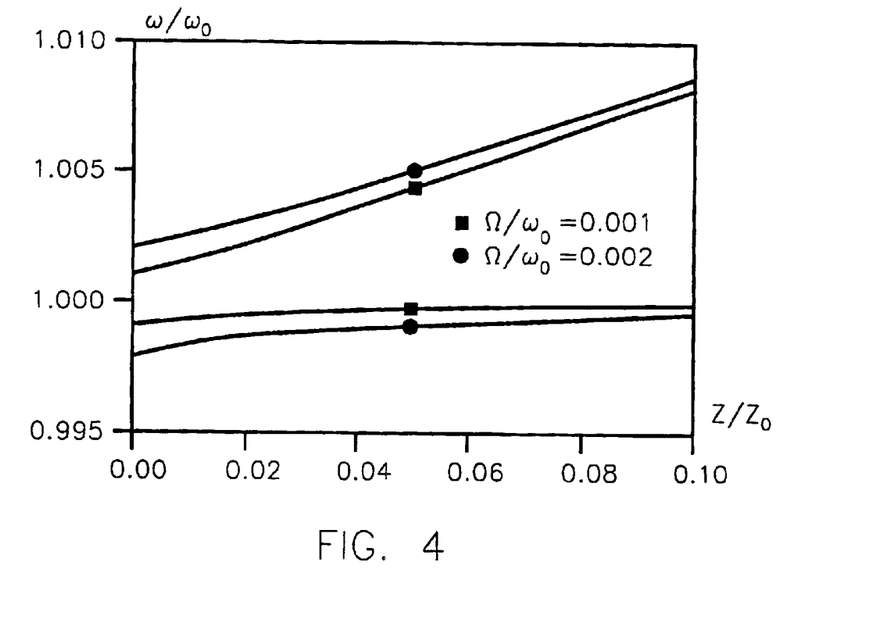
FIG. 4 shows resonant frequencies of a piezoelectric gyroscope vary as a function of load impedance of the output circuit.

The relation of the resonant frequency $\omega$ versus (Z) for fixed $\Omega/\omega_0$=0.0, and 0.002, in FIG. 4. Said the impedance dependence of the resonant frequencies further complicates the design of these gyroscopes because the resonant frequencies of the piezoelectric gyroscopes have to be tuned for the gyroscopes to work in double resonant conditions with the driving frequency, the resonant frequency of the primary mode, and the resonant frequency of the secondary mode very close to one another.

Forced Vibration Analysis

Figure 5:
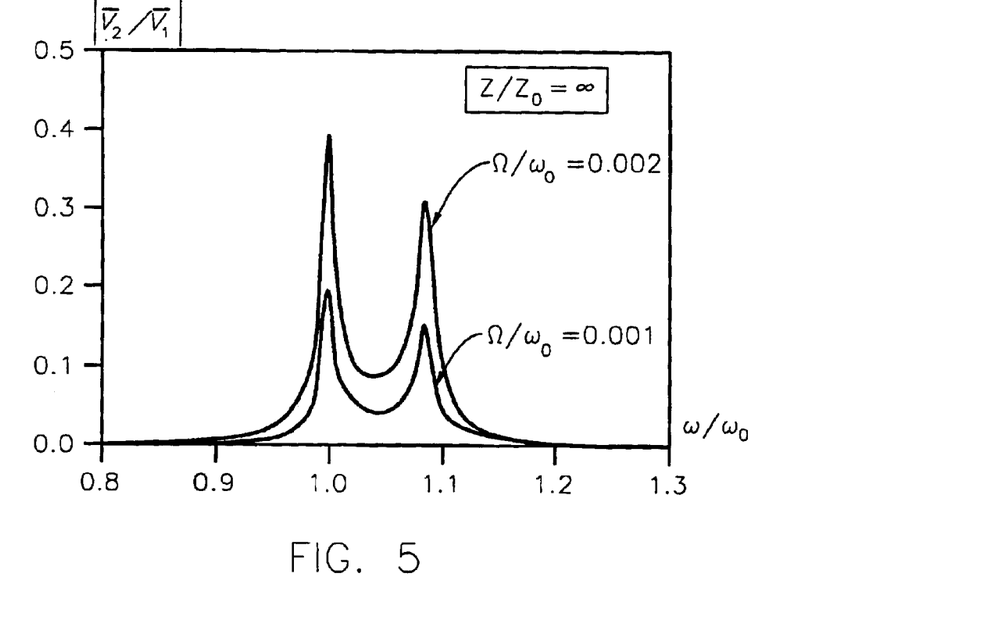
FIG. 5 shows output voltage as a function of the driving frequency, for two rotation rates and for the case of open circuit sensing electrodes in a piezoelectric gyroscope.
Figure 6:
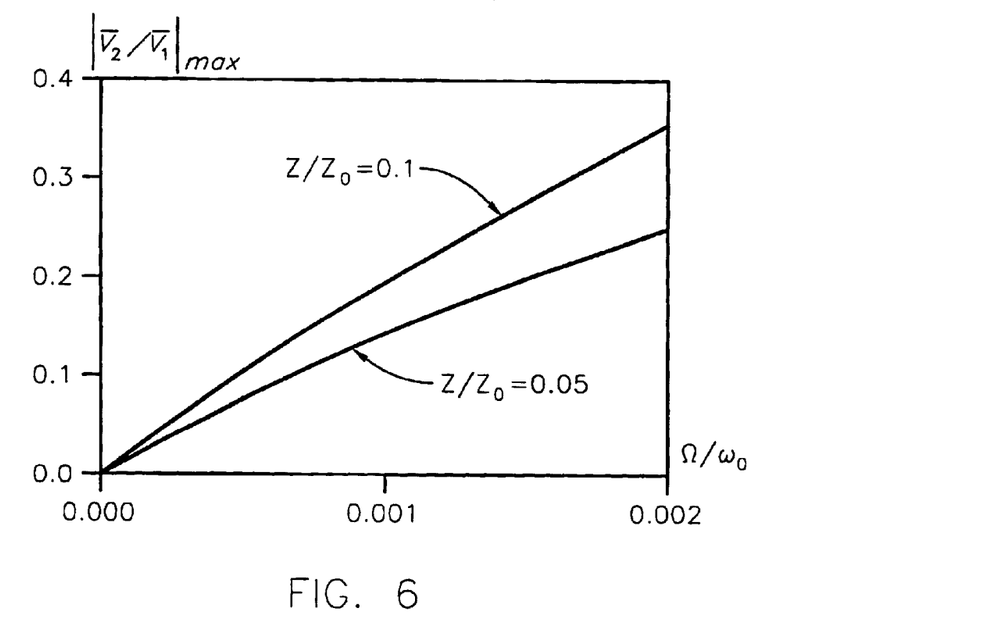
FIG. 6 shows variation of the maximum output voltage of a piezoelectric gyroscope as a function of rotation rate at two values of load impedance.

Output voltage as a function of the driving frequency $\omega$ is plotted in FIG. 5 for the case of open sensing electrodes (Z=∞ for large sensing voltage), and two values of ($\Omega$). There are two resonant frequencies with values near one. The locations of these two resonant frequencies are, for large Z, suggested by FIG. 4. It is seen that near the two resonant frequencies the voltage sensitivity assumes maximal values. Numerical tests also show that if smaller values of Q are used in the calculations, the peaks become narrower and higher. Although higher peaks suggest higher voltage sensitivity, narrower peaks require better control in tuning the sensor into resonant conditions. It is noted that when ($\Omega$) is doubled, the output voltage is essentially double as well, suggesting a linear response to ($\Omega$). This is better shown in FIGS. 5 and 6 for two values of rotation rate and load Z, respectively. When ($\Omega$) is much smaller than $\omega_0$, the relation between output voltage and ($\Omega$) is essentially linear, as Eqn. 15-3 indicates. Therefore said gyroscopes are useful for detecting rotation rate relatively slow compared to operating frequency. Since piezoelectric gyroscopes can be made very small with high resonant frequencies, the relatively slow rotation rate gyroscopes can detect linearly in a variety of applications as further described in:

"A Review of Vibratory Gyroscope:", Burdess et al., Engineering Science and Education Journal, pp 249–254, (1994); and "Micromachined Gyroscopes", Soderkvist, Sensors and Actuators A, 43, pp 65–71, (1994).

Continuing, when ($\Omega$) is not small, the quadratic effect of ($\Omega$) in the denominator or Eqn 15-3 begins to show its effect, which determines the range of the sensor for a linear response. Since the response is linear in ($\Omega$), in the analysis of piezoelectric gyroscopes the centrifugal force which represents higher order effects of ($\Omega$) can be neglected and the centrifugal force which represents higher order effects of ($\Omega$) can be neglected and the contribution to sensitivity is from Coriolis force which is linear in ($\Omega$).

Figure 7:
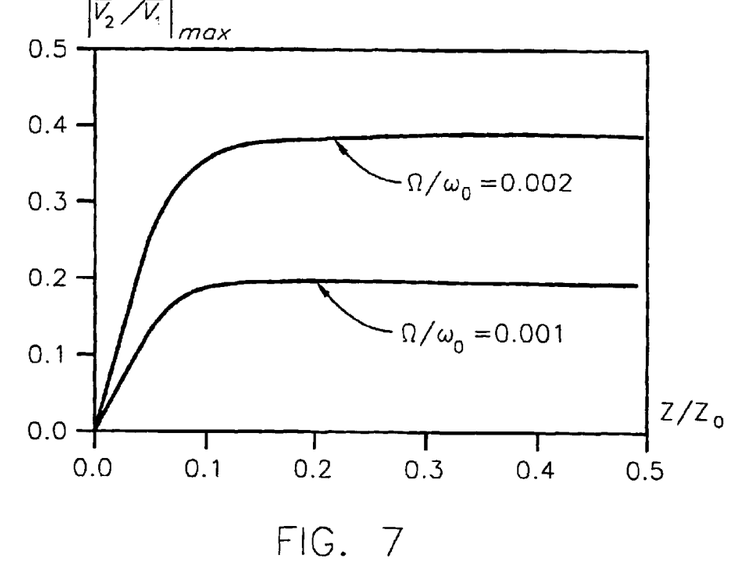
FIG. 7 shows variation of the maximum output voltage of a piezoelectric gyroscope as a function of load impedance for two values of rotation rate.

The variation of the maximum output voltage according to the load Z is also of interest in practice and is given in FIG. 7 for two values of ($\Omega$). For small loads the sensing electrodes are almost shorted and the output voltage increases and exhibits an essentially linear range. As the load is increased the sensing electrodes are in fact essentially open with a saturated output voltage and a very small output current. These behaviors or the output voltage as a function of Z can also be seen fro Eqn 15-3.

Figure 8:
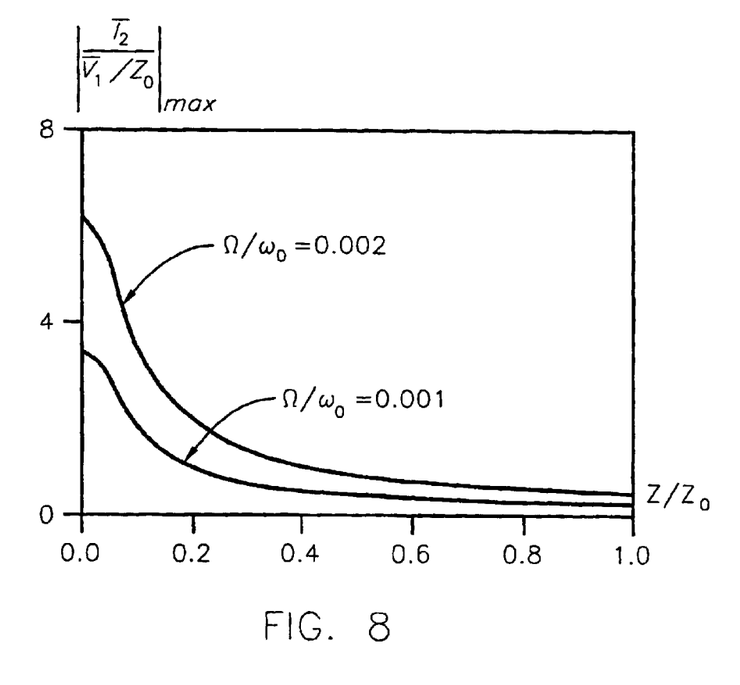
FIG. 8 shows the relation of the normalized output current versus the load impedance of a piezoelectric gyroscope, for fixed values of rotation rate.

FIG. 8 shows the relation of the normalized output current versus the load impedance for fixed values of ($\Omega$). Since the output current, like the output voltage shown in FIG. 5, also has resonance behavior, what is shown in FIG. 8 is the maximal value for the output current. As expected, a simple decreasing behavior for output voltage is exhibited, which is the opposite to that shown in FIG. 7. This is natural as physically, when the output voltage is large, the output current should be small when the effect of Z is considered, as also shown by Eqn. 15-4.

Figure 9:
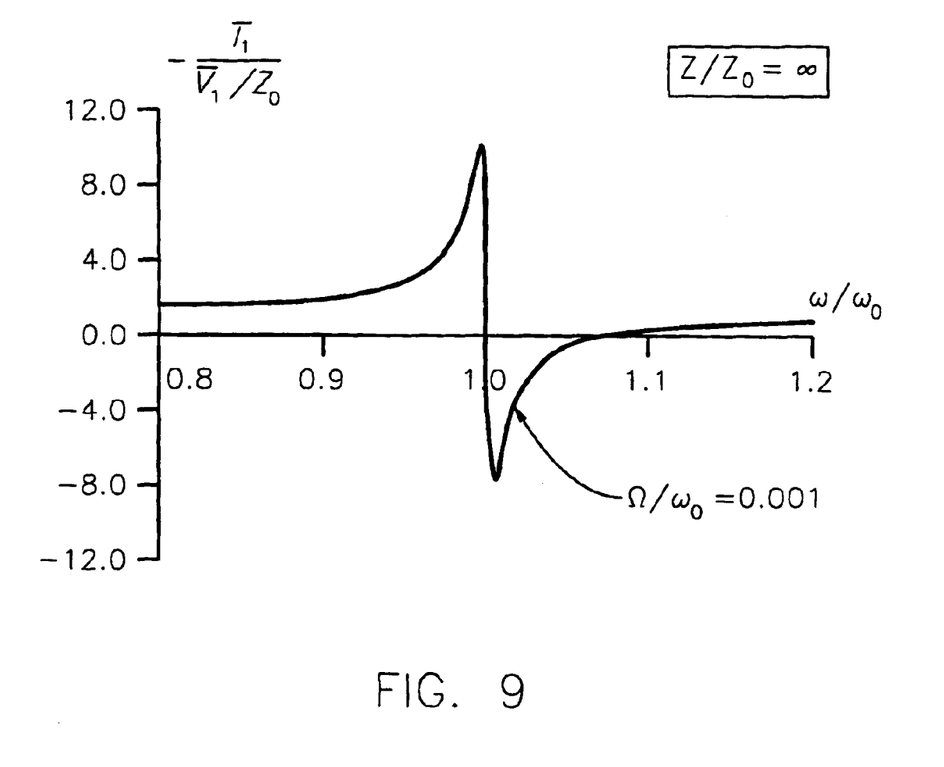
FIG. 9 shows the relation of the normalized real part of the driving current of a piezoelectric gyroscope, versus the driving frequency.

The relation of the normalized driving current $-\bar{I}_1 Z_0/\bar{V}_1$ (or the inverse of the normalized input impedance), versus the driving frequency is plotted in FIG. 9. What is shown is in fact the real part of the driving current, the imaginary part is much smaller. Near resonance the driving current assumes maximal and minimal values. For a particular frequency the driving current vanishes, (anti-resonance). Such behaviors are typical for piezoelectric resonant devices. There is in fact another frequency near 1.1 where similar behavior exists but is small and can not be seen.

Note that FIGS. 1 and 2 show orthogonally oriented elements (rods) projecting from masses (M). It is to be understood that this is preferred, but that substantial orthogonality is within the scope of the invention. It is also to be understood that a "Mass" (M) from which substantially orthogonally oriented elements project can be any element which functionally maintains the relative position of said substantially orthogonally oriented elements during use.

It is also noted that the orthogonally oriented elements (rods) shown in FIG. 1 are elongated in the longitudingal direction in which they project from Mass (M). Each said orthogonally oriented element therefore has a longitudinal and a lateral dimension. Prefered material Polarizations (P) shown in FIG. 1 are oriented along the lateral directions of said orthogonally oriented elements (rods). The same is true regarding each orthogonally oriented element (rod) in the FIG. 2 system. Any functional combination of Polarizations (P), however, are to be considered within the scope of the invention.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A piezoelectric gyroscope system comprising two substantially orthogonally oriented elements projecting from a mass, each said substantially orthogonally oriented element having a pair of electrodes present thereupon, wherein the electrodes in a pair thereof are oriented substantially parallel to one another; such that in use said piezoelectric system is caused to rotate about an axis oriented perpendicular to a plane formed by said two substantially orthogonally oriented elements while an extension inducing driving voltage is applied across a pair of electrodes on one thereof, to the end that an output voltage which is related to the rotation rate, is sensed across the pair of electrodes on the other substantially orthogonally oriented element.

2. A piezoelectric gyroscope system as in claim 1, in which the rotation about an axis oriented perpendicular to a plane formed by said two substantially orthogonally oriented elements is centered at the mass from which the two substantially orthogonally oriented elements project.

3. A multiple piezoelectric gyroscope system comprising a plurality of piezoelectric gyroscope systems, wherein each of, said piezoelectric gyroscope systems comprises:

first and second substantially orthogonally oriented elements projecting from a mass, each said substantially orthogonally oriented element having a pair of electrodes present thereupon, wherein the electrodes in a pair thereof are oriented substantially parallel to one another; such that in use said piezoelectric system is caused to rotate about an axis oriented perpendicular to a plane formed by said two substantially orthogonally oriented elements while an extension inducing driving voltage is applied across a pair of electrodes on one thereof, to the end that an output voltage which is related to the rotation rate, is sensed across the pair of electrodes on the other substantially orthogonally oriented element;

said piezoelectric gyroscope system being oriented such that the first and second substantially orthogonally oriented elements of each thereof are all in a common plane;

the electrodes on the first of each said substantially orthogonally oriented elements in each said piezoelectric gyroscope having electrical connection with the first substantially orthogonally oriented elements on the other piezoelectric gyroscopes; and the electrodes on the second of each said substantially orthogonally oriented elements in each said piezoelectric gyroscope having electrical connection with the second substantially orthogonally oriented elements on the other piezoelectric gyroscopes;

such that in use said multiple piezoelectric system is caused to rotate about an axis oriented perpendicular to the common plane formed by all said two substantially orthogonally oriented elements, while an extension inducing driving voltage is applied across all electrically interconnected electrode pairs on the first elements thereof, to the end that an output voltage which is related to the rotation rate, is sensed across the electrically interconnected electrode pairs on the second substantially orthogonally oriented elements thereof.

4. A multiple piezoelectric gyroscope system as in claim 3, wherein there are four piezoelectric gyroscope systems present, said four piezoelectric gyroscope systems being oriented with respect to one another such that the masses thereof are positioned as the four corners of a rectangle, and such that the substantially orthogonally related elements are oriented along sides thereof.

5. A multiple piezoelectric gyroscope system as in claim 4, in which the rectangle is a square.

6. A method of developing a voltage which is proportional to a rotation rate, comprising the steps of:

a. providing a piezoelectric gyroscope system comprising two substantially orthogonally oriented elements projecting from a mass, each said substantially orthogonally oriented element having a pair of electrodes present thereupon, wherein the electrodes in a pair thereof are oriented substantially parallel to one another; such that in use said piezoelectric system is caused to rotate about an axis oriented perpendicular to a plane formed by said two substantially orthogonally oriented elements while an extension inducing driving voltage is applied across a pair of electrodes on one thereof, to the end that an output voltage which is related to the rotation rate, is sensed across the pair of electrodes on the other substantially orthogonally oriented element;

b. causing said piezoelectric gyroscope to rotate about an axis oriented perpendicular to a plane formed by said two substantially orthogonally oriented elements;

c. applying an extension inducing driving voltage is applied across a pair of electrodes on one substantially orthogonally oriented element;

to the end that an output voltage which is related to the rotation rate, is sensed across the pair of electrodes on said other substantially orthogonally oriented element.

7. A method of developing a voltage which is proportional to a rotation rate, comprising the steps of:

a. providing at least two piezoelectric gyroscope systems, each thereof comprising:

a piezoelectric gyroscope system comprising two substantially orthogonally oriented elements projecting from a mass, each said substantially orthogonally oriented element having a pair of electrodes present thereupon, wherein the electrodes in a pair thereof are oriented substantially parallel to one another; such that in use said piezoelectric system is caused to rotate about an axis oriented perpendicular to a plane formed by said two substantially orthogonally oriented elements while an extension inducing driving voltage is applied across a pair of electrodes on one thereof, to the end that an output voltage which is related to the rotation rate, is sensed across the pair of electrodes on the other substantially orthogonally oriented element;

b. functionally interconnecting said at least two piezoelectric gyroscope systems;

c. causing said piezoelectric gyroscope which is comprised of at least two piezoelectric gyroscope systems, to rotate about an axis oriented perpendicular to a plane formed by said two substantially orthogonally oriented elements;

d. applying an extension inducing driving voltage across a pair of electrodes on one substantially orthogonally oriented element of each of said at least two piezoelectric gyroscope systems;

to the end that an output voltage which is related to the rotation rate, is sensed across functionally interconnected pairs of electrodes on said other substantially orthogonally oriented elements of each of said at least two piezoelectric gyroscope systems.

8. A method of developing a voltage which is proportional to a rotation rate as in claim 7, in which the step of providing at least two piezoelectric gyroscope systems involves providing four piezoelectric gyroscope systems which are oriented with respect to one another such that the masses thereof are positioned as the four corners of a rectangle, and such that the substantially orthogonally related elements are oriented along sides thereof.

9. A piezoelectric gyroscope system as in claim 1, wherein the two substantially orthogonally oriented elements which project from said mass are each elongated in the direction in which they project from said mass, and thereby have longitudinal and lateral dimensions; said two substantially orthogonally oriented elements each being polarized in a direction along the lateral direction thereof.

10. A multiple piezoelectric gyroscope system as in claim 3, wherein each said first and second substantially orthogonally oriented elements associated with a piezoelectric gyroscope system are elongated in the direction in which they project from the mass thereof, and thereby have longitudinal and lateral dimensions; said substantially orthogonally oriented elements each being polarized in a direction along the lateral direction thereof.

* * * * *